US007641466B2

(12) United States Patent
Malick et al.
(10) Patent No.: US 7,641,466 B2
(45) Date of Patent: Jan. 5, 2010

(54) TABLET PRESS

(75) Inventors: Daniel Malick, Leezen (DE); Wolfgang Soltau, Neu Darchau/Katemin (DE); Joerg Gaedecke, Geesthacht (DE); Matthias Rau, Dassendorf (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 12/277,718

(22) Filed: Nov. 25, 2008

(65) Prior Publication Data

US 2009/0191297 A1 Jul. 30, 2009

(30) Foreign Application Priority Data

Jan. 25, 2008 (DE) ....................... 10 2008 006 045

(51) Int. Cl.
*B29C 43/08* (2006.01)

(52) U.S. Cl. .................................... 425/345; 425/450.1

(58) Field of Classification Search ................... 425/78, 425/193, 195, 344, 345, 352–355, 408–412, 425/405.1, 451.7
See application file for complete search history.

(56) References Cited

U.S. PATENT DOCUMENTS 7,118,367 B2 * 10/2006 Hinzpeter et al. ........... 425/345
7,553,147 B2 * 6/2009 Kramer ...................... 425/345

* cited by examiner

*Primary Examiner*—Yogendra Gupta
*Assistant Examiner*—Thu Khanh T Nguyen
(74) *Attorney, Agent, or Firm*—Vidas, Arrett & Steinkraus, P.A.

(57) ABSTRACT

A tablet press with a rotor, which is rotatably mounted in a stand of the tablet press and which has an upper punch accommodation for the upper punches and a lower punch accommodation for the lower punches of the tablet press, as well as a die plate with a series of die bores which are aligned with the upper and the lower punches, wherein the die plate consists of at least two ring segments which can be attached on the rotor by means of a fastening device, wherein clamping elements are arranged in axis parallel passages of the rotor spaced apart in the perimeter distance, which act against the ring segments from the bottom side and clamp against an abutment surface of the rotor, characterized in that at least one drive device for the clamping elements is arranged in the stand of the tablet press, with a coupling element adjustable in the height, which can be selectively set into engagement with the lower end of the clamping element.

11 Claims, 5 Drawing Sheets

TABLET PRESS

CROSS-REFERENCE TO RELATED APPLICATIONS

Not applicable.

STATEMENT REGARDING FEDERALLY SPONSERED REASEARCH

Not applicable.

BACKGROUND OF THE INVENTION

A typical tablet press is a so-called rotary press. If it is dealt with tablet presses above and below, of course such rotary presses are also meant by which arbitrary other pressed articles can be produced, like in the foodstuff-, washing agent- or other fields, for instance.

The typical construction of a rotary press is to mount a rotor in a stand, wherein the rotor has bores for the guides of upper and lower punches, between which a die plate is arranged with die bores with which the punches co-operate during the circulation of the rotor. The compression punches are actuated by compression rollers in compression stations, and guided outside of the same via control cams.

The rotor is driven by a suitable drive motor. In this context, it has also become known to integrate an electric motor into a rotor, wherein the rotor of the electric motor lies in the outside and is in engagement with the inner wall of the press rotor. The press rotor is mostly formed in one piece. Even the die plate can be formed in one piece with the rotor.

However, from DE 101 59 114, the entire contents of which is incorporated herein by reference, it has also become known to compose the die plate from individual segments. The segments are secured in a suitable way in the rotor. From the cited document, it has also become known to press the segments against an abutment surface of the rotor with the aid of compression set screws.

The present invention is based on the objective to form a tablet press with a segmented die plate, such that preset stressing forces can be applied to the die segments in a simple way.

BRIEF SUMMARY OF THE INVENTION

In the present invention, at least one drive device for the clamping elements is arranged in the stand of the tablet press, with a drive element adjustable in the height, which can be selectively set into engagement with the lower end of the clamping element.

Like in the state of the art, the clamping element is guided through a passage in the rotor, and it can be set into engagement to bear against the bottom side of the assigned die segment. A drive device, which may work electrically, hydraulically or pneumatically, is designed to apply an axial pressing force on the clamping element either directly or indirectly, in order to exert a preset clamping force on the assigned die segment by the clamping element. The drive device is stationarily arranged in the stand, due to which the rotor must be adjusted by a corresponding rotation such that the drive element and the clamping element are aligned with each other when the clamping element is to be actuated.

With the aid of the present invention, the clamping of the die elements can be made to work automatically, and it is not necessary to apply a preset force on the clamping element by an operator, for instance with the aid of a torque wrench. When clamping the segments manually, the operator must apply the necessary clamping or releasing force, respectively, by himself. For this reason it might occur that the necessary tension is not guaranteed. When the tabletting tools are built in, the manual clamping or releasing can be performed only with difficulty or not at all.

Advantageous embodiments of the present invention are indicated in subclaims.

One embodiment of the present invention provides that the rotor is surrounded by a stationary shell, which co-operates sealingly with the rotor and forms a processing space, and that the lower ends of the clamping elements are situated outside of the processing space. The processing space is realised such that it essentially surrounds the rotor, but leaves the upper and the lower regions of the rotor open. Therefore, the processing space is relatively small, but through this it permits to clean all the parts facing the processing space, without that a disassembly of punches or the like is necessary. Therefore, according to a further embodiment it is also advantageous when the clamping elements are sealingly guided into the processing space through the passages. On the contrary, the drive device is situated outside the processing space. In the remodelling, it has therefore not to be worked in a narrow space. Even the portions of the clamping elements facing the processing space can be cleaned in the processing space, along with the cleaning of the processing space, and thus they have not to be disassembled.

Different embodiments are conceivable how to bring the clamping elements axially into abutment with the segments of the die plate. One embodiment of the present invention provides that a spindle drive is assigned to the lower end of the clamping element, and a rotational drive device is provided whose lathe spindle can be coupled with the spindle drive. In this context, it is provided in a further embodiment of the present invention that the drive device is connected to a lifting device in the stand. However, a rotational drive is also conceivable whose lathe spindle is axially adjustable in order to be set into engagement with the spindle drive of the clamping element.

A die plate is made up of plural segments, of five segments for instance. One embodiment provides that two clamping elements are provided for each segment. Through this, uniform clamping of the segments can be obtained, in particular when parallel drive devices are operated at the same time according to a further embodiment of the invention.

In fact, it is conceivable to select the number of the drive devices in the stand to be equal to the number of the clamping elements. The expenditure for this is relatively high. According to one embodiment of the present invention, a smaller number of drive devices can therefore be used also, when a control device for the rotational drive of the rotor is designed such that the rotor can be positioned in preset rotational positions, in order to align the drive element with the clamping element.

BRIEF DESCRIPTION OF THE SEVERAL VIEWS OF THE DRAWINGS

Examples of the realisation of the present invention are explained in more detail by means of drawings in the following.

DETAILED DESCRIPTION OF THE INVENTION

Figure 1:
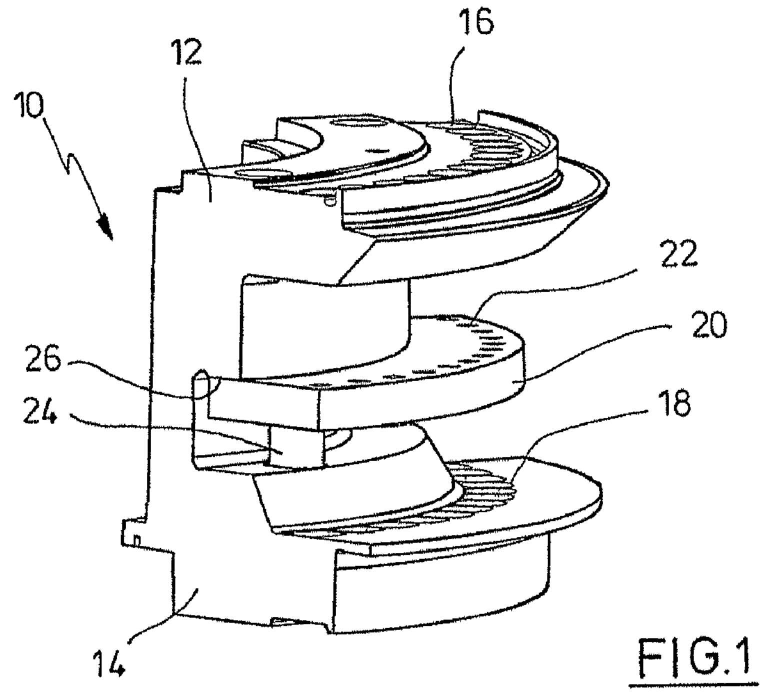
FIG. 1 shows a segment of the rotor of the tablet press of the present invention in a perspective side view.
Figure 2:
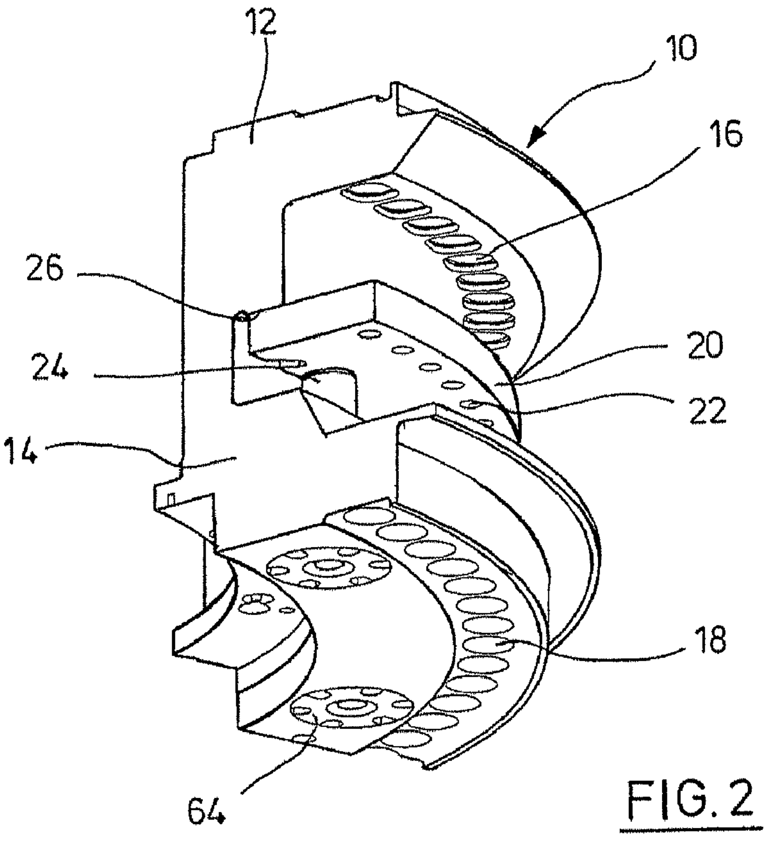
FIG. 2 shows a similar perspective view like FIG. 1, but skew from the bottom side.

While this invention may be embodied in many different forms, there are described in detail herein a specific preferred embodiment of the invention. This description is an exemplification of the principles of the invention and is not intended to limit the invention to the particular embodiment illustrated FIGS. 1 and 2 show a segment of a rotor 10 for a tablet press, like the same is generally known in the state of the art. The rotor has an upper punch guide 12 and a lower punch guide 14 which have guide bores 16 or 18, respectively, which receive not shown compression punches. Only as an example, concerning the accommodation of the compression punches it is referred to the already mentioned DE 10 2004 040 163, the entire contents of which is incorporated herein by reference. The rotor 10 is made to rotate by a not shown drive motor. According to the lastly mentioned document, the motor can be integrated into the rotor 10. The rotor 10 is rotatably mounted on a pillar of a not shown stand for the tablet press. Even this is described in DE 10 2004 040 163.

Figure 6:
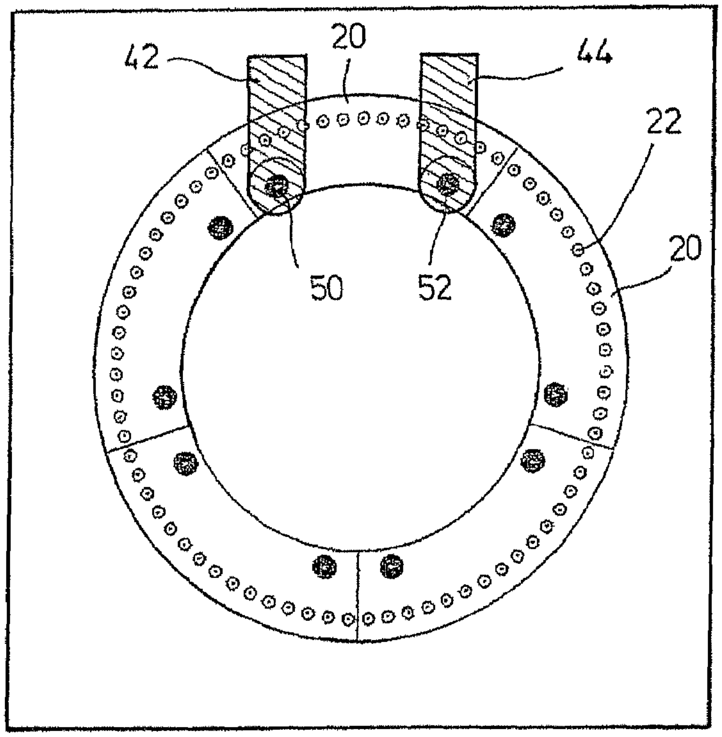
FIG. 6 shows a top view on a segmented die plate with a clamping device after FIG. 5.
Figure 7:
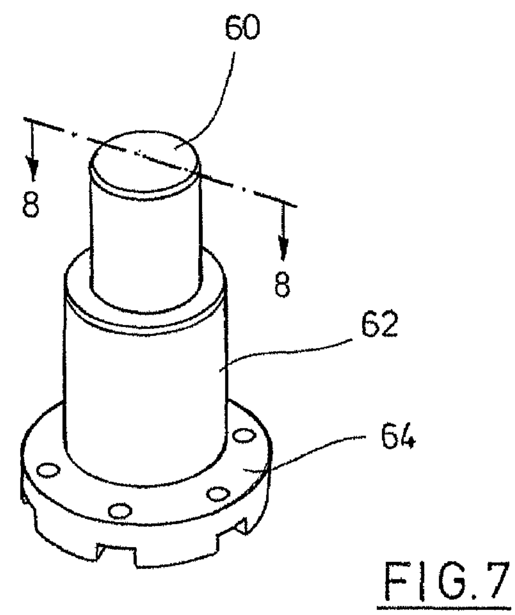
FIG. 7 shows a detail of a spindle drive for the actuation of a clamping element according to the present invention.

The rotor 10 receives a die plate which is composed of individual segments 20. FIG. 6 shows the top view on a die plate with five segments arranged into a circle, which have bores 22. In FIGS. 1 and 2, one clamping stamp or clamping element 24, respectively, is shown, which extends through a passage in the lower punch guide 14 in abutment with the lower side of the segment 20, in order to press the segment against a radial abutment surface 26.

As comes out from FIGS. 1 and 2, accommodations 12, 14 for upper and lower punches are each formed in one piece.

Figure 3:
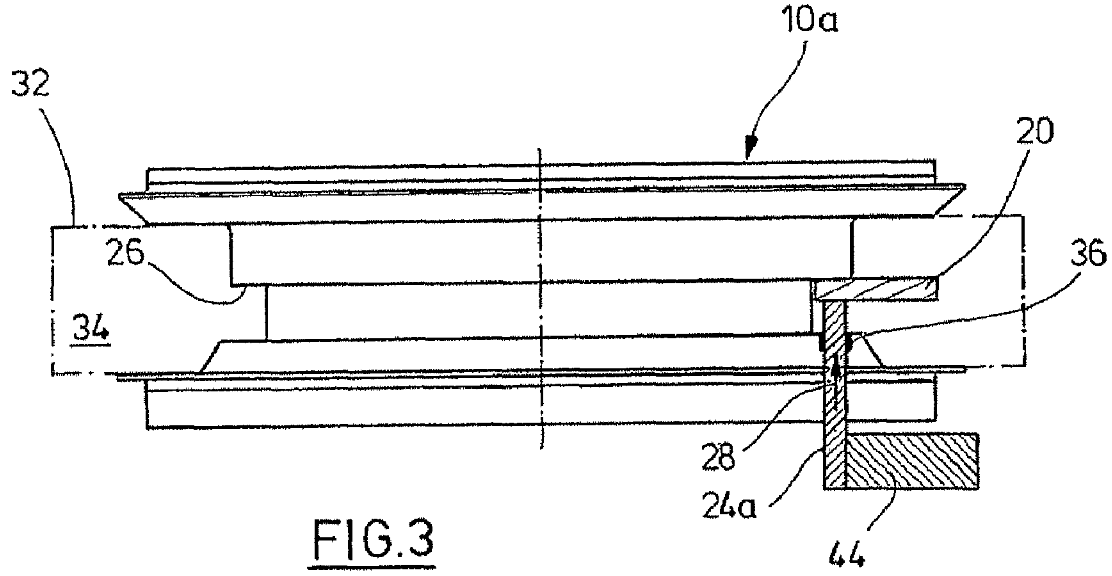
FIG. 3 shows the side view of the rotor of the tablet press of the present invention, with a schematically indicated clamping element for a die segment.

FIG. 3 shows the side view of a rotor 10*a*, which is substantially similar to the rotor 10 after FIGS. 1 and 2. One single die segment 20 is indicated, which is pressed against an abutment surface 26, namely with the aid of a clamping element 24*a*. As indicated by arrow 28, the clamping element 24*a* can be changed in its axial direction and its length, respectively. For this purpose, a drive device 44 is provided, which is connected to the not shown stand of the tablet press.

At 32 in FIG. 3 it is indicated by dashed lines how a stand extends around the rotor 10*a*. It co-operates sealingly with the rotor 10*a* and forms a compression space 34. A sealing is shown at 36 in FIG. 3, which seals the clamping element 24*a*, so that the compression space 34 is sealed against the surroundings even at this site.

Figure 4:
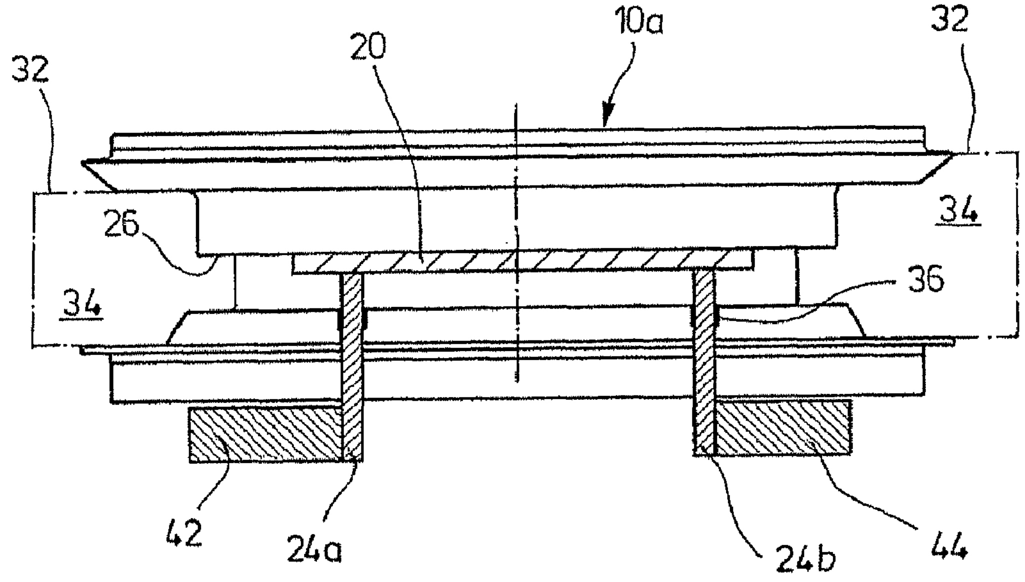
FIG. 4 shows a similar depiction like FIG. 3, with two clamping elements for one segment of the die plate.

The rotor after FIG. 4 is similar to that one after FIG. 3, and therefore it is provided with the same reference sign. It is shown rotated about 90° with respect to FIG. 3. One sees that the segment 20 is pressed against the abutment surface 26 of the rotor 10*a* with the aid of two segments 24*a*, 24*b* spaced apart in the perimeter direction. Thus, two drives 42, 44 are provided, which simultaneously secure the segment 20 in the rotor 10*a* via the clamping elements 24*a*, 24*b*.

Figure 5:
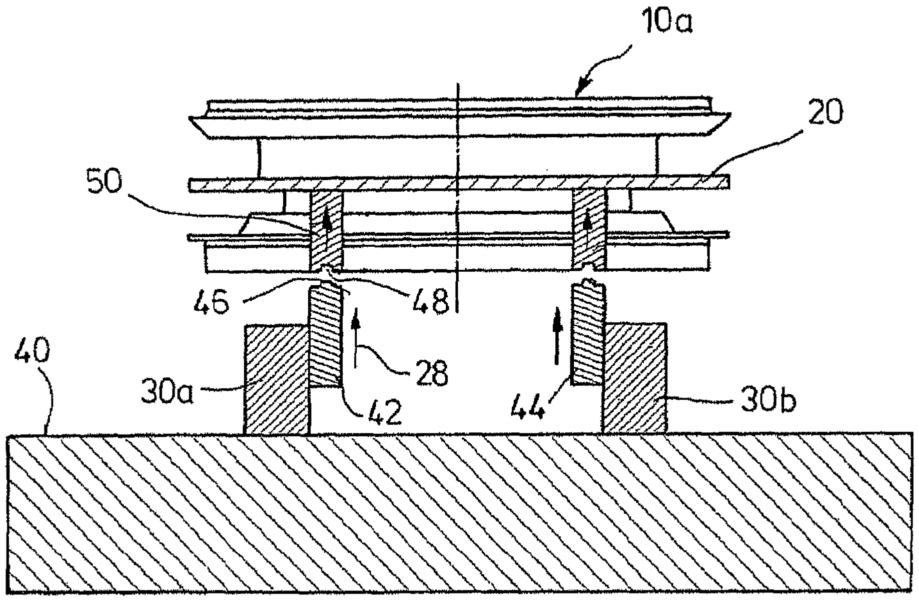
FIG. 5 shows again a similar depiction like FIG. 4, with a detail related to the actuation of clamping elements.

In FIG. 5, the same rotor as in FIGS. 3 and 4 is shown again, and it has therefore also the same reference signs. The drive devices 42, 44 are shown to be arranged via lifting devices 30*a*, 30*b* on a platform 40 of the otherwise not shown stand of the tablet press. The drive devices 42, 44 rotatingly actuate drive- or coupling elements 46. However, the drive elements 46 can not only be rotated but also moved axially along with the drive devices 42, 44 according to arrow 28. This takes place through the lifting devices 30*a*, 30*b*, which move the drive devices 42, 44 in the height. The drive- and coupling elements 46 have a bridge on the upper end, which can be set into engagement with a recess 48 of clamping elements 50, 52, in order to rotate a spindle or the like. This rotation has the result that it moves axis parallel on the other portion of the clamping elements 50, 52 and presses or releases the segment 20. In FIG. 6, this is shown with respect to the upper segment 20. Even here, the two clamping elements 50, 52 can be actuated simultaneously, in order to press the segment 20 uniformly against the abutment surface of the rotor.

In FIG. 6, it can be recognised further that two clamping elements belong to each segment 20, for instance the clamping elements 50, 52, wherein only two drive devices 42, 44 are provided for all clamping elements 50, 52. For clamping the segments, the rotor 10*a* must therefore be rotated about a preset angle in order to align the clamping elements 50, 52 with the drive- or coupling elements 46.

Figure 9:
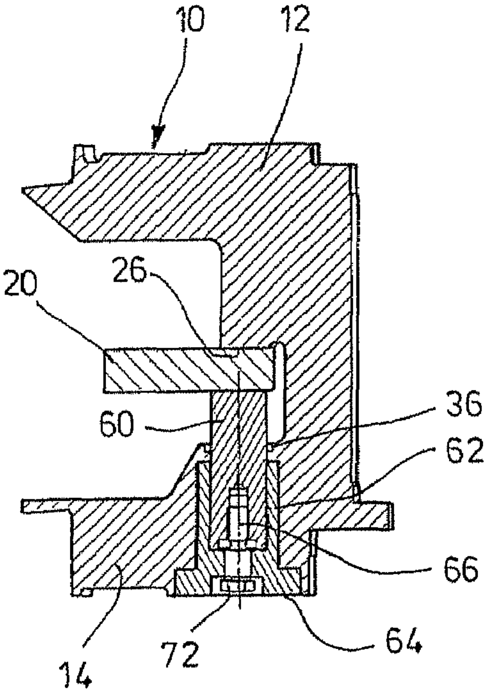
FIG. 9 shows the cross section after FIG. 8, set into a rotor according to FIG. 1 or FIG. 2, respectively.

In FIG. 9, an example for a clamping element is shown, which presses a segment 20 against the abutment surface 26 according to FIGS. 1 and 2. As can be recognised further, there is a punch 60 inside a liner 62 which has a flange 64 at the bottom end. In FIG. 2 it can be recognised how the flange 64 is received in a recess of the lower punch guide 14 and secured therein. The movement of the punch 60 towards the bottom side is limited by an inner step in the liner 62.

A threaded spindle 66 is screwed centrally into an internally threaded bore 68 of the punch 60. The threaded spindle 66 is supported via a radial flange 70 on the inner step. At the lower end, the threaded spindle 66 has a hexagon head 72, which is situated inside a lower recess 74 of the liner 62.

When the threaded spindle 66 is rotated via the hexagon head 72, the punch 60 is axially shifted through this. In a lateral, radially passing slit 76 of the liner 62, there is a head 78 of a screw 80 which is radially screwed into the punch 60. The head 78 can move axis parallel in the slit 76 to a certain amount; however, it prevents a rotational movement of the punch 60.

Figure 10:
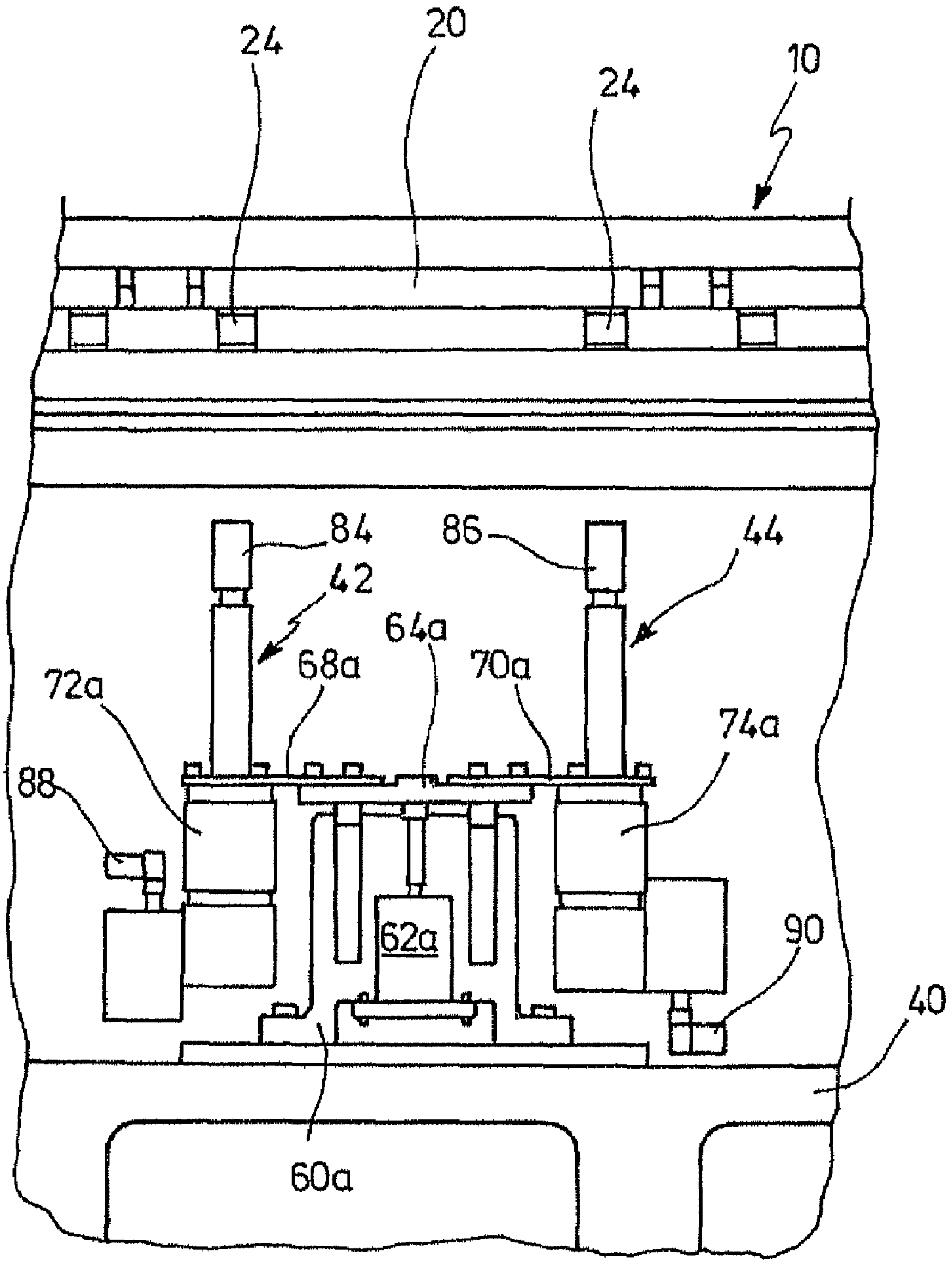
FIG. 10 shows the side view of a part of a rotor with two parallel drive devices.

In FIG. 10, it can be recognised how a holder 60*a* for a lifting cylinder 62*a* is arranged on the press stand 40. The lifting cylinder actuates a cross arm 64*a*, which is screwed together with the arms 68*a*, 70*a* and which is connected to the shell of drive motors 72*a*, 74*a* at the lower end. Thus, by the actuation of the lifting cylinder 62*a*, the arrangement of the two drive motors 72*a*, 74*a* can be shifted in the height. The drive motors 72*a*, 74*a* have shafts 76*a* or 78*a*, respectively, which run in a guide sleeve 80*a*, 82*a* and which have a coupling element 84, 86 at the end. The drive motors 72*a*, 74*a* are pneumatic motors for instance, with the aid of which the coupling elements 84, 86 can be made to rotate. For this purpose, the motors 72*a*, 74*a* are provided with connection pieces 88, 90 for compressed air.

Figure 8:
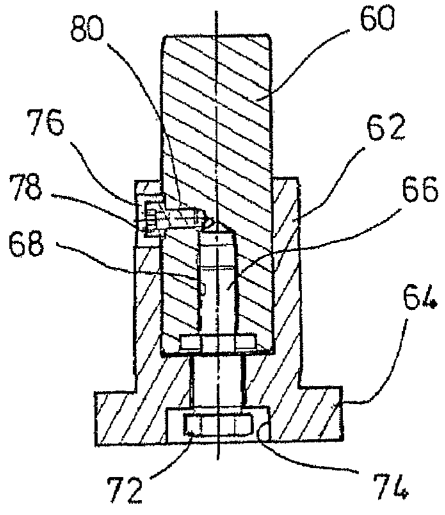
FIG. 8 shows a cross section through the depiction after FIG. 7, along the line 8-8.

In FIG. 10, the lower part of the rotor 10 is also indicated in parts, with the clamping elements 24. As can be recognised, the coupling elements 84, 86 are directed towards the clamping elements 24 shown in the centre. When now the whole arrangement is moved upward with the aid of the lifting cylinder 82, the coupling elements 84, 86 move through a passage in the lower punch guide, as has been already described above, in order to arrive in engagement with a spindle of the clamping elements not shown in FIG. 10. The spindle drive can be realised such as is depicted by means of FIGS. 8 and 9, for instance. With the aid of the device shown in FIG. 10, two clamping elements 24 can therefore be actuated at the same time for one segment 20. When the clamping elements for a further die segment are to be actuated, the rotor 10 is rotated further about the corresponding angle, until the coupling elements 84, 86 are aligned with the assigned clamping elements 24 again.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A tablet press with a rotor, which is rotatably mounted in a stand of the tablet press and which has an upper punch accommodation for the upper punches and a lower punch accommodation for the lower punches of the tablet press, as well as a die plate with a series of die bores which are aligned with the upper and the lower punches, wherein the die plate consists of at least two ring segments which can be attached on the rotor by means of a fastening device, wherein clamping elements are arranged in axis parallel passages of the rotor spaced apart in the perimeter distance, which act against the ring segments from the bottom side and clamp against an abutment surface of the rotor, characterized in that at least one drive device (42, 44) for the clamping elements (50, 52; 60, 62) is arranged in the stand (40) of the tablet press, with a coupling element (40, 72) adjustable in the height, which can be selectively set into engagement with the lower end of the clamping element (50, 52; 60, 62).

2. A tablet press according to claim 1, characterized in that the rotor (10, 10*a*) is surrounded by a stationary shell (32), which co-operates sealingly with the rotor (10, 10*a*) and forms a processing space (34), and that the lower ends of the clamping elements (50, 52; 60, 62) are situated outside of the processing space (34).

3. A tablet press according to claim 2, characterized in that the clamping elements (50, 52; 60, 62) are sealingly guided in the passages of the rotor (10, 10*a*).

4. A tablet press according to claim 1, characterized in that a spindle drive is assigned to the lower end of the clamping element, and a rotational drive is provided whose lathe spindle can be coupled with the spindle drive.

5. A tablet press according to claim 1, characterized in that the drive device is connected to a lifting device (30*a*, 30*b*) in the stand.

6. A tablet press according to claim 1, characterized in that two clamping elements (60, 62 and 50, 52, respectively) are provided for each segment (20 and 24, respectively).

7. A tablet press according to claim 1, characterized in that at least two drive devices (40, 42) are arranged in parallel.

8. A tablet press according to claim 1, characterized in that an electric, pneumatic or hydraulic drive device is provided.

9. A tablet press according to claim 1, characterized in that a drive motor for the rotor (10, 10*a*) has a control device, which is designed such that the rotor can be positioned in preset rotational positions with respect to the drive device (30*a*, 30*b*).

10. A tablet press according to claim 1, characterized in that a liner (62) is stationarily housed in a bore of the rotor 10, which guides a punch (60) axis parallel in the rotor (10), a threaded spindle (60) is screwed into a threaded bore of the punch (60) open towards the bottom, which is axially supported on the liner (62), and that the lower end of the threaded spindle (66) has an engagement surface (72) for the engagement with the threaded spindle (66) of the rotational drive.

11. A tablet press according to claim 10, characterized in that a longitudinal, axis parallel slit (76) is formed in the liner (62), in which a head (78) of a screw (80) is received which is radially screwed into the punch (60), passing through the slit (76).

* * * * *